United States Patent
Wengrovitz et al.

(10) Patent No.: US 12,003,492 B2
(45) Date of Patent: Jun. 4, 2024

(54) METHOD AND APPARATUS FOR INTERNET OF THINGS (IOT) DYNAMIC POLICY MANAGEMENT

(71) Applicant: Mutualink, Inc., Wallingford, CT (US)

(72) Inventors: Michael S. Wengrovitz, Concord, MA (US); Joseph R. Mazzarella, Tolland, CT (US); Anand Setlur, Naperville, IL (US)

(73) Assignee: MUTUALINK, INC., Wallingford, CT (US)

( * ) Notice: Subject to any disclaimer, the term of this patent is extended or adjusted under 35 U.S.C. 154(b) by 0 days.

(21) Appl. No.: 17/018,064

(22) Filed: Sep. 11, 2020

(65) Prior Publication Data

US 2022/0084692 A1  Mar. 17, 2022

(51) Int. Cl.
*H04L 9/40* (2022.01)
*G16Y 30/00* (2020.01)
(Continued)

(52) U.S. Cl.
CPC ............ *H04L 63/064* (2013.01); *G16Y 30/00* (2020.01); *G16Y 40/10* (2020.01); *G16Y 40/35* (2020.01);
(Continued)

(58) Field of Classification Search
CPC ....... H04L 9/0637; H04L 9/30; H04L 9/0825; H04L 9/006; H04L 9/0988; H04L 9/14; H04L 9/3297; H04L 63/0428; H04L 63/06; H04L 63/20; H04L 63/10; H04L 63/123; H04L 9/0367; H04L 9/088; H04L 9/3242; H04L 9/3239; H04L 63/1458; H04L 63/1416; H04L 63/104; H04L 67/55;
(Continued)

(56) References Cited

U.S. PATENT DOCUMENTS 7,643,445 B2  1/2010 Mills et al.
8,320,874 B2  11/2012 Mills et al.
(Continued)

OTHER PUBLICATIONS

International Search Report and Written Opinion of the International Searching Authority directed to related International Patent Application No. PCT/US2021/049681, dated Dec. 20, 2021; 13 pages.

*Primary Examiner* — Kyung H Shin
(74) *Attorney, Agent, or Firm* — Sterne, Kessler, Goldstein & Fox P.L.L.C.

(57) ABSTRACT

Some embodiments include a broker policy manager (BPM) comprising a transceiver and a processor, where the processor is configured to dynamically change a policy associated with an Internet of Things (IoT) client certificate based on an incident invitational model. In some embodiments the processor can determine that a first IoT client is a participant of an incident communications network corresponding to an incident, and transmit first instructions to a certificate-based IoT broker to change a first IoT policy associated with a first certificate of the first IoT client, to enable the first IoT client to publish or subscribe to a topic that corresponds to the incident. The first instructions can indicate a change to a second IoT policy associated with a second certificate of a second IoT client that enables the second IoT client to publish or subscribe to the topic that corresponds to the incident.

23 Claims, 8 Drawing Sheets

(51) Int. Cl.
*G16Y 40/10* (2020.01)
*G16Y 40/35* (2020.01)
*H04L 51/214* (2022.01)
*H04L 67/02* (2022.01)
*H04L 67/12* (2022.01)
*H04L 67/562* (2022.01)

(52) U.S. Cl.
CPC ........ *H04L 51/214* (2022.05); *H04L 63/0823* (2013.01); *H04L 63/1458* (2013.01); *H04L 63/20* (2013.01); *H04L 67/02* (2013.01); *H04L 67/12* (2013.01); *H04L 67/562* (2022.05)

(58) Field of Classification Search
CPC ....... H04L 67/34; H04L 67/12; H04L 67/562; H04L 51/214; H04L 63/08; H04L 51/226; H04L 67/01; H04L 63/064; H04L 51/04; H04L 63/102; G06Q 20/383; G06Q 20/389; G06Q 20/3823; G06Q 20/065; G06Q 20/40; G01M 3/243; G01M 3/00; F17D 1/08; F17D 5/06; G01N 29/024; G01N 29/14; G01N 29/07; G01N 29/4436; G01N 29/4472; G01N 29/46; H04W 4/70; H04W 4/90; H04W 12/088; G06F 13/00

See application file for complete search history.

(56) References Cited

U.S. PATENT DOCUMENTS

| | | | |
|---|---|---|---|
| 8,364,153 B2 | 1/2013 | Boucher et al. | |
| 8,811,940 B2 | 8/2014 | Boucher et al. | |
| 8,929,851 B2 | 1/2015 | Mills et al. | |
| 9,553,831 B2 | 1/2017 | Pignataro et al. | |
| 11,061,548 B1* | 7/2021 | Catakli | H04L 67/75 |
| 2003/0204722 A1* | 10/2003 | Schoen | H04L 63/064 |
| | | | 726/1 |
| 2005/0053013 A1 | 3/2005 | Traylor et al. | |
| 2012/0040635 A1 | 2/2012 | Boucher et al. | |
| 2012/0266209 A1* | 10/2012 | Gooding | H04L 63/20 |
| | | | 726/1 |
| 2014/0165731 A1* | 6/2014 | Linford | G01N 29/46 |
| | | | 73/592 |
| 2019/0215694 A1* | 7/2019 | Rubin | H04L 63/1458 |
| 2019/0288975 A1* | 9/2019 | Hara | H04L 51/214 |
| 2019/0327320 A1* | 10/2019 | Rubin | H04L 67/562 |
| 2021/0117251 A1* | 4/2021 | Cristofi | G06F 9/542 |
| 2021/0211468 A1* | 7/2021 | Griffin | H04L 63/20 |

* cited by examiner

METHOD AND APPARATUS FOR INTERNET OF THINGS (IOT) DYNAMIC POLICY MANAGEMENT

BACKGROUND

Field

The embodiments generally relate to managing Internet of Things (IoT) devices during an incident.

Background

Internet of Things (IoT) clients communicate in a one-to-many fashion using topic-based publish and subscribe messages exchanged via an intermediate Broker. For example, a first IoT client subscribes to a particular topic. When a second IoT client publishes a message regarding the particular topic, an IoT Broker fans-out the published message to IoT clients that have subscribed to the particular topic such as the first IoT client. If the first IoT client unsubscribes to the particular topic, the IoT Broker no longer fans-out a message regarding the particular topic to the first IoT client.

A plethora of disparate communications resources exist including resources using private wireless communications (e.g., public safety and first responder communications networks), public switched network communications resources, public wireless networks, networks of video surveillance devices, private security networks, and the like. Additionally, millions of consumers and public officials are now equipped with smartphone devices that include multiple communications abilities including both voice and video communications.

Often these communications resources cannot communicate with each other. For example, private wireless communication networks, such as those used by public safety or commercial users, are typically isolated from one another and utilize different and often incompatible technologies. While interoperability products are available to interconnect such diverse systems, cooperation among the entities involved is often a barrier to full and scalable implementation. Thus, first responder silo-ed communication systems exist where control of the resources of each organization coupled to the system is controlled by a central administrator or controller, and each organization providing resources to the system must relinquish control of its resources to the central administrator. The organization responsible for the operation of its radio system(s) may be unable or unwilling to grant control of its resources either to peer organizations or to a higher-level organization.

U.S. Pat. No. 7,643,445, entitled Interoperable Communications System and Method of Use, issued on Jan. 5, 2010, and U.S. Pat. No. 8,320,874, entitled System and Method for Establishing an Incident Communications Network, issued on Nov. 27, 2012, both of which are incorporated by reference in their entirety, describe systems and methods for providing an interoperable communications system ("interop system," also referred to as an Incident Communications Network) including a plurality of otherwise disjunct or disparate communications systems that addressed the deficiencies of prior art systems. The '445 and '874 patents specifically describe methods for establishing an incident communications network that enables interoperable communications among communications resources controlled by multiple organizations during an incident involving emergency or pre-planned multi-organization communications where a communications resource is controlled by an administrator within an organization.

Additionally, U.S. Pat. No. 8,364,153, entitled Mobile Interoperability Workstation Controller Having Video Capabilities within an Incident Communications Network, issued on Jan. 29, 2013, ("Mobile IWC Patent") which is also incorporated herein by reference in its entirety, extends the concepts of the '445 and '874 patents. Namely, the Mobile IWC Patent includes enhanced video capture and streaming capabilities that are integrated with incident information and events to facilitate improved management and analysis of incidents or events in which an incident communications network is employed.

U.S. Pat. No. 8,811,940, entitled Dynamic Asset Marshalling Within an Incident Communications Network, issued on Aug. 19, 2014, ("Marshalling Patent") which is also incorporated herein by reference in its entirety, extends the concepts of the '445 and '874 patents. Namely, the Marshalling Patent provides systems and methods that marshal resources into an incident communications network based on a variety of factors, such as the type of incident and the type of resource being marshaled.

U.S. Pat. No. 8,929,851, entitled System and Method for Establishing an Incident Communications Network ("'851 patent"), issued on Jan. 6, 2015, which is incorporated herein by reference in its entirety, extends the concepts of the '445 and '874 patents, Marshalling Patent, and the Mobile IWC Patent.

BRIEF SUMMARY OF THE INVENTION

Some embodiments include a system, method, and computer program product for Internet of Things (IoT) dynamic policy management during an incident. For example, IoT client devices can create or join an incident communications network and during the incident, some embodiments enable dynamic IoT subscribe/publish policy changes associated with the corresponding certificates of the IoT client devices. The dynamic IoT policy changes can assist agencies during an incident (e.g., a national crisis, emergency, or pre-planned multi-organization communications) to resolve the incident.

Some embodiments include a system for a broker policy manager (BPM) that includes a transceiver and a processor coupled to the transceiver. The processor can determine that a first IoT client is a participant of an incident communications network corresponding to an incident, and transmit first instructions to a certificate-based IoT broker to change a first IoT policy associated with a first certificate of the first IoT client, that enables the first IoT client to publish and/or subscribe to a topic associated or linked with the incident. The processor can receive an indication that a second IoT client accepts an invitation from the first IoT client to join the incident communications network, and transmit second instructions to the certificate-based IoT broker to change a second IoT policy associated with a second certificate of the second IoT client that enables the second IoT client to publish and/or subscribe to the topic that is associated or linked to the incident. In some embodiments the first IoT client and the second IoT client exchange information via the incident communications network and/or via the certificate-based IoT broker.

To determine that the first IoT client is a participant of the incident communications network, the processor can receive an indication via the transceiver, directly or indirectly from the first IoT client, that the first IoT client has created the incident, or that the first IoT client has been invited to join the incident communications network. To indirectly receive an indication that the first IoT client is a participant of the incident communications network, the processor can subscribe to a topic that includes the BPM (e.g., the BPM as an IoT client subscribes to Topic-BPM.) The first IoT client can communicate the incident name and the first IoT client identifier as information on the topic, to the certificate-based IoT broker associated with the topic (e.g., publish a message including the Topic-BPM/incident name/first IoT client identifier). The certificate-based IoT broker receives and distributes the published message including Topic-BPM/incident name/first IoT client identifier to subscribers of Topic-BPM which includes the BPM. Thus, the processor indirectly receives the indication that the first IoT client is a participant of the incident, from the certificate-based IoT broker. The BPM in turn adjusts the publish/subscribe certificate permissions for the first IoT client.

In some embodiments, the subscribe and published messages are based on a real time publication-subscription, data-sync, or request-response protocol including but not limited to, HyperText Transfer Protocol (HTTP), Message Queueing Telemetry Transport (MQTT) protocol, Extensible Messaging and Presence Protocol (XMPP), Streaming Text Oriented Messaging Protocol (STOMP), Advanced Message Queuing Protocol (AMQP), Web Application Messaging Protocol (WAMP), Java Message Service (JMS), ZeroMQ Message Transport Protocol (ZMTP), or proprietary messaging protocols, where the subscription includes subscribing to the topic relating to the incident.

In some embodiments, the first IoT client includes: a software routine; a web browser; a map or a region of a map; a graphical user interface (GUI); an actuator; an artificial intelligence or analytics based object, event, or condition; a state change state detection module that interprets video data, either alone or in concert with other real time, historical or predictive data from other sensors, systems, databases, analytical functions, or information sources; a sensor; a sensor coupled to another device or module that causes an alarm, event notification, or warning signal to be transmitted to a rules-based or pre-designated recipient agent; a gas sensor; a smoke/fire detector; or a contact closure of a switch or panic button.

In some embodiments, the first IoT client comprises a GUI of an interoperability work station (IWS) coupled to the incident communications network, and the processor can determine that a third IoT client shares the first certificate with the first IoT client, where the first certificate enables the third IoT client to publish and/or subscribe to the topic that includes the incident.

In some embodiments, to determine that the first IoT client is a participant of the incident communications network, the processor can receive via the transceiver, an indication on a multicast channel of a multicast-based communication system, that the first IoT client has created the incident, or that the first IoT client has been invited to join the incident communications network.

Further embodiments, features, and advantages, as well as the structure and operation of the various embodiments, are described in detail below with reference to accompanying drawings. It is noted that the embodiments are presented herein for illustrative purpose only. Additional embodiments will be apparent to persons skilled in the relevant art(s) based on the teachings contained herein.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION

Figure 1:
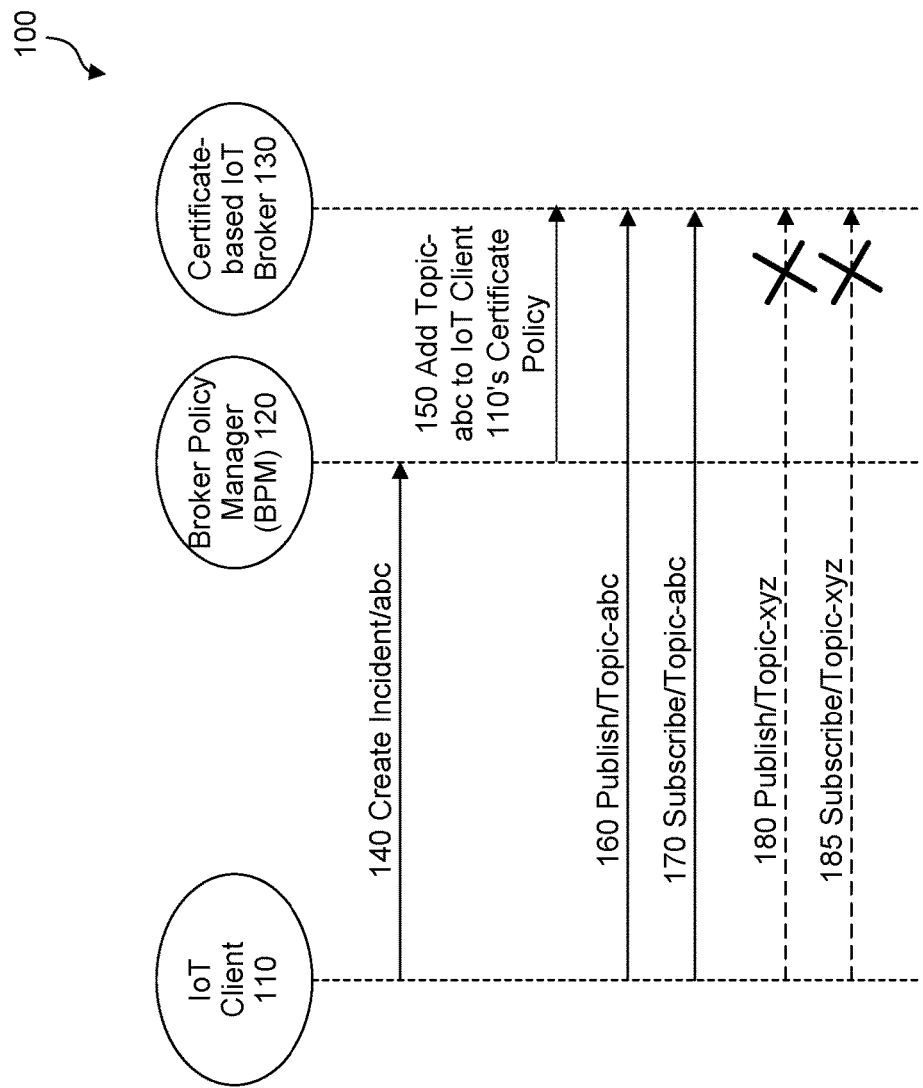
FIG. 1 illustrates a system for dynamic Internet of Things (IoT) policy management during an incident, according to an example embodiment.

In an Internet of Things (IoT) system, IoT clients communicate in a one-to-many fashion using topic-based publish and subscribe messages exchanged via an IoT Broker over the Internet. For example, IoT client A can subscribe to a topic and inform the IoT Broker. When IoT client B publishes information to that topic and informs the IoT Broker, the IoT Broker fans the published information of that topic to IoT client A and other IoT clients that have subscribed to that topic. Some IoT Brokers can include certificates to establish the confirmed identities of IoT clients to prevent an unauthorized IoT client from eavesdropping or receiving published information. The certificates can also include policies that include permissions for an IoT client to publish and/or subscribe to messages on certain topics. For example, a policy of certificate A may allow IoT client A to perform the following: publish messages on Topics 1 and 2, but not other topics; or subscribe to messages on Topic-3, but not publish messages on Topic-3.

The policies associated with certificates are communicated to the IoT Broker via a network-based application programming interface (API) and a graphical user interface (GUI). For example, an operator uses the GUI to set up the system certificates and policies in a static manner at system design time. The static arrangements identify the IoT clients that are allowed to publish and subscribe to certain topics. For example, an IoT client A can be a the controller for a security video camera that streams video of a business' premises. The associated policy and certificate may indicate that the video from IoT client A can only be published to the business owner's devices to maintain privacy. While the static certificates and policies maintain privacy, there are incidents (e.g., emergencies) in which owners of the IoT clients may want the certificates and policies to be dynamically changed to allow others to have access to the published information related to the incidents. For example, in the event of a fire, the business owner of IoT Client A may allow the security video camera (IoT client A) to stream video and/or images to the fire department, or even yield control of the security video camera to the fire department. But, static certificates and policies do not permit this flexibility. Some embodiments enable dynamic IoT policy management during an incident.

An incident communications network enables interoperable communications among communications resources controlled by multiple organizations or individuals during an incident involving emergency or pre-planned multi-organization communications in which a communications resource is controlled by an administrator within an organization, or by an individual. The incident communications network includes interoperability workstation (IWS) controllers to control communications resources and enable a user a means to control and interface with the incident communications network. The incident communications network are described in the '445, '874, and '851 patents, Marshalling Patent, and the Mobile IWC Patent that incorporated herein by reference.

Some embodiments enable IoT client devices to join an incident communications network and enable dynamic IoT policy management of the IoT client devices during an incident. FIG. 1 illustrates a system 100 for dynamic Internet of Things (IoT) policy management during an incident, according to an example embodiment. System 100 includes IoT Client 110, Broker Policy Manager (BPM) 120, and Certificate-based IoT Broker 130. IoT Client 110 can be: a software routine; a web browser; a map or a region of a map; a graphical user interface (GUI); an actuator; an artificial intelligence or analytics based object, event, or condition; a state change state detection module that interprets video data, either alone or in concert with other real time, historical or predictive data from other sensors, systems, databases, analytical functions, or information sources; a sensor; a sensor coupled to another device or module that causes an alarm, event notification, or warning signal to be transmitted to a rules-based or pre-designated recipient agent; a gas sensor; a smoke/fire detector; or a contact closure of a switch or panic button.

Certificate-based IoT Broker 130 executes the certificates and policies for corresponding IoT clients such as IoT Client 110. As described above, the policies indicate whether IoT Client 110 has permission to subscribe to and/or publish on various topics. BPM 120 can dynamically change the policies of the certificate associated with IoT Client 110 based on an incident invitational model. In some embodiments, when IoT Client 110 is a participant in an incident communications network, IoT Client 110 (e.g., a GUI on an interoperability workstation (IWS) or mobile IWS) can publish and/or subscribe to messages associated with that incident-topic. Some exchanges in system 100 are described below:

At 140 IoT Client 110 can create an incident named 'incident-abc.' In some embodiments, BPM 120 can determine that IoT Client 110 has joined incident-abc communications network and/or created incident-abc communications network in a variety of ways. In some embodiments, BPM 120 listens to a multicast channel to learn that IoT Client 110 has been invited to join incident-abc communications network or has created incident-abc communications network. In some embodiments, BPM 120 receives a signal from an Interoperability Workstation (IWS) that IoT Client 110 has been invited to join incident-abc communications network. In some embodiments, BPM 120 directly or indirectly receives a communication from IoT Client 110 via a signaling channel indicating that IoT Client 110 has joined or created incident-abc communications network as described above. The signaling channel can include request and receive exchanges based on a real time publication-subscription, data-sync, or request-response protocol, including but not limited to, HyperText Transfer Protocol (HTTP), Message Queueing Telemetry Transport (MQTT) protocol, Extensible Messaging and Presence Protocol (XMPP), Streaming Text Oriented Messaging Protocol (STOMP), Advanced Message Queuing Protocol (AMQP), Web Application Messaging Protocol (WAMP), Java Message Service (JMS), ZeroMQ Message Transport Protocol (ZMTP), or proprietary messaging protocols, where the request includes subscribing to the topic relating to the incident.

At 150, BPM 120 can transmit a signal to Certificate-based IoT Broker 130 to change the policy of the certificate associated with IoT Client 110 to allow IoT Client 110 to now publish and subscribe to Topic-abc. Certificate-based IoT Broker 130 updates IoT Client 110's certificate policy accordingly.

At 160, IoT Client 110 can transmit a message to Certificate-based IoT Broker 130 to publish on Topic-abc. When the message is received, Certificate-based IoT Broker 130 verifies that IoT Client 110 is permitted to publish on Topic-abc based on the dynamic policy change due to 150 above. Since IoT Client 110 has permission to publish information regarding Topic-abc, Certificate-based IoT Broker 130 distributes the published Topic-abc to IoT clients (not shown) that have subscribed to Topic-abc.

At 170, IoT Client 110 can transmit a message to subscribe to Topic-abc. When the message is received, Certificate-based IoT Broker 130 verifies that IoT Client 110 is permitted to subscribe to Topic-abc based on the dynamic policy change due to 150 above. Thereafter, IoT Client 110 can receive information regarding Topic-abc published from other IoT clients (not shown) that are authorized to publish on Topic-abc.

In this example IoT Client 110 is not authorized to publish or subscribe to Topic-xyz associated with incident xyz, because IoT Client 110 is not a member of incident-xyz. Thus messages 180 to publish or 185 to subscribe to Topic-xyz are not accepted by Certificate-based IoT Broker 130.

Figure 2:
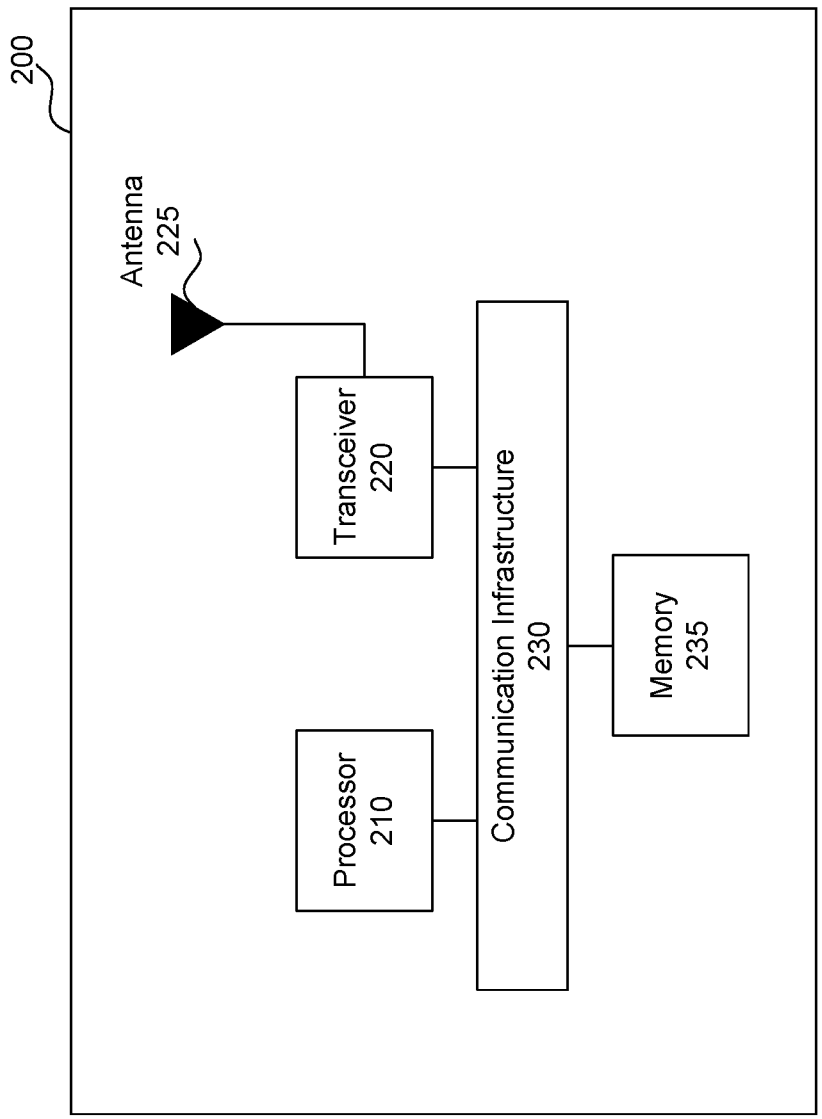
FIG. 2 illustrates a block diagram of an example wireless system for dynamic IoT policy management during an incident, according to an example embodiment.

FIG. 2 illustrates a block diagram 200 of an example wireless system for dynamic IoT policy management during an incident, according to an example embodiment. As a convenience and not a limitation, system 200 may be described with elements of FIG. 1. System 200 can be IoT Client 110, BPM 120, and/or Certificate-based IoT Broker 130 of FIG. 1. System 200 may include processor 210, transceiver 220, communication infrastructure 230, memory 235, and antenna 225 that together perform operations enabling dynamic IoT policy management during an incident. Transceiver 220 transmits and receives wireless communications signals via antenna 225. Communication infrastructure 230 may be a bus. Memory 235 may include random access memory (RAM) and/or cache, and may include control logic (e.g., computer software), computer instructions, and/or data. Processor 210, upon execution of the computer instructions, can be configured to perform the functionality described herein for dynamic IoT policy management during an incident. Alternatively, processor 210 can include its own internal memory (not shown), and/or be "hard-wired" (as in a state-machine) configured to perform the functionality described herein for dynamic IoT policy management during an incident. Antenna 225 coupled to transceiver 220, may include one or more antennas and/or panels (not shown) that may be the same or different types to enable wireless communication over a wireless network.

In some embodiments transceiver 220 may transmit and receive signals via a wired network (not shown.)

Figure 3:
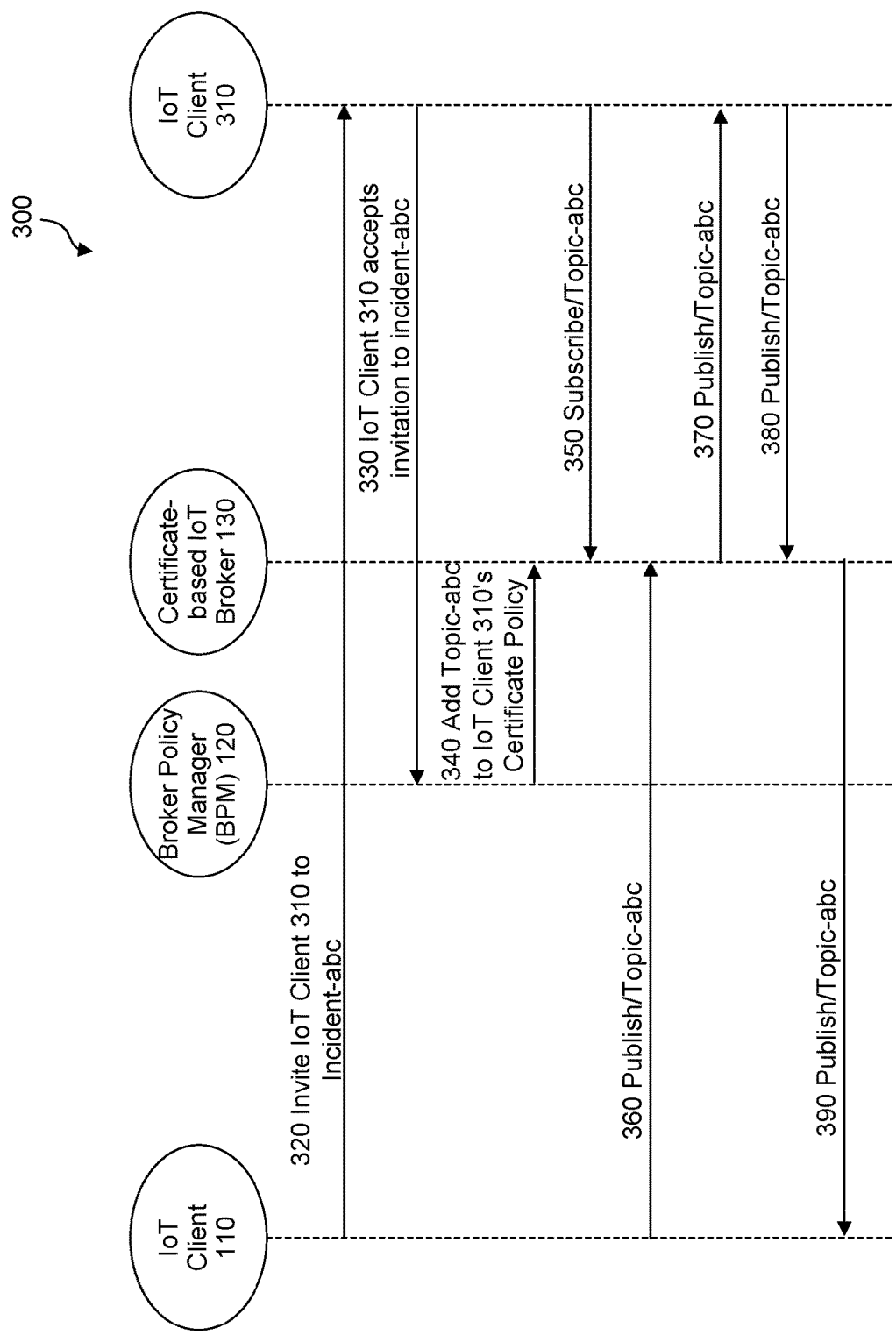
FIG. 3 illustrates a system for dynamic IoT policy management during an incident with a second IoT client, according to an example embodiment.

FIG. 3 illustrates a system 300 for dynamic IoT policy management during an incident with a second IoT client, according to an example embodiment. As a convenience and not a limitation, system 300, may be described with elements of FIGS. 1 and 2. System 300 includes IoT Client 110, BPM 120, Certificate-based IoT Broker 130, and IoT Client 310. In this example, IoT Client 110 invites IoT Client 310 to join incident-abc communications network, and some embodiments enable IoT Client 310 to publish and/or subscribe to messages on Topic-abc.

At 320, IoT Client 110 can invite IoT Client 310 to join incident-abc communications network.

At 330, IoT Client 310 accepts the invitation to join incident-abc communications network. BPM 120 learns about IoT Client 310 joining incident-abc communications network via a signaling channel via IoT Client 110 and/or IoT Client 310, or by listening to a multicast channel of the incident communications network. BPM 120 dynamically determines whether to adjust the policies of the certificate corresponding to IoT Client 310 so that IoT Client 310 can publish and/or subscribe to IoT messages on Topic-abc. In this example, BPM 120 determines that IoT Client 310 can publish and subscribe to Topic-abc.

At 340, BPM 120 can transmit a signal to Certificate-based IoT Broker 130 to change the policy of the certificate associated with IoT Client 310 to allow IoT Client 310 to now publish and subscribe to Topic-abc. Certificate-based IoT Broker 130 updates IoT Client 310's certificate policy accordingly.

At 350, IoT Client 310 can transmit a message to subscribe to Topic-abc. When the message is received, Certificate-based IoT Broker 130 verifies that IoT Client 310 is permitted to subscribe to Topic-abc based on the dynamic policy change due to 340 above. Thereafter, IoT Client 310 can receive information regarding Topic-abc published from other IoT clients (e.g., IoT Client 110) that are authorized to publish on Topic-abc. IoT Clients 110 and 310 can now exchange IoT messages on Topic-abc via Certificate-based IoT Broker 130. In addition to or alternatively, IoT Clients 110 and 310 can exchange media using existing means (e.g., via the incident-abc communications network.)

At 360, IoT Client 110 can transmit a message to Certificate-based IoT Broker 130 to publish on Topic-abc. Certificate-based IoT Broker 130 verifies that IoT Client 110 is permitted to publish on Topic-abc. For example, if incident-abc was a fire and the fire department was a member of the incident-abc communication network, IoT Client 110 can publish a message to Topic-abc that causes IoT Client 310 to perform an action. If IoT Client 310 was a fire sensor, IoT Client 110 can publish a message to Topic-abc that causes IoT Client 310 to transmit whether any smoke is detected, a temperature reading, and/or a fire alarm.

At 370, Certificate-based IoT Broker 130 distributes the published message on Topic-abc to IoT Client 310 that subscribed to Topic-abc (e.g., at 350 above.)

At 380, IoT Client 310 transmits a publish message on Topic-abc that is received by Certificate-based IoT Broker 130 that verifies that IoT Client 310 is permitted to publish on Topic-abc. For example, IoT Client 310 can publish a message on Topic-abc in response to the instructions received due to 370, according to the published message on Topic-abc. For example, IoT Client 310 may transmit a report or readings of a sensor (e.g., whether any smoke is detected, a temperature reading, and/or a fire alarm.)

At 390, Certificate-based IoT Broker 130 distributes the published message on Topic-abc to IoT Client 110 based at least on 170 of FIG. 1.

Figure 4:
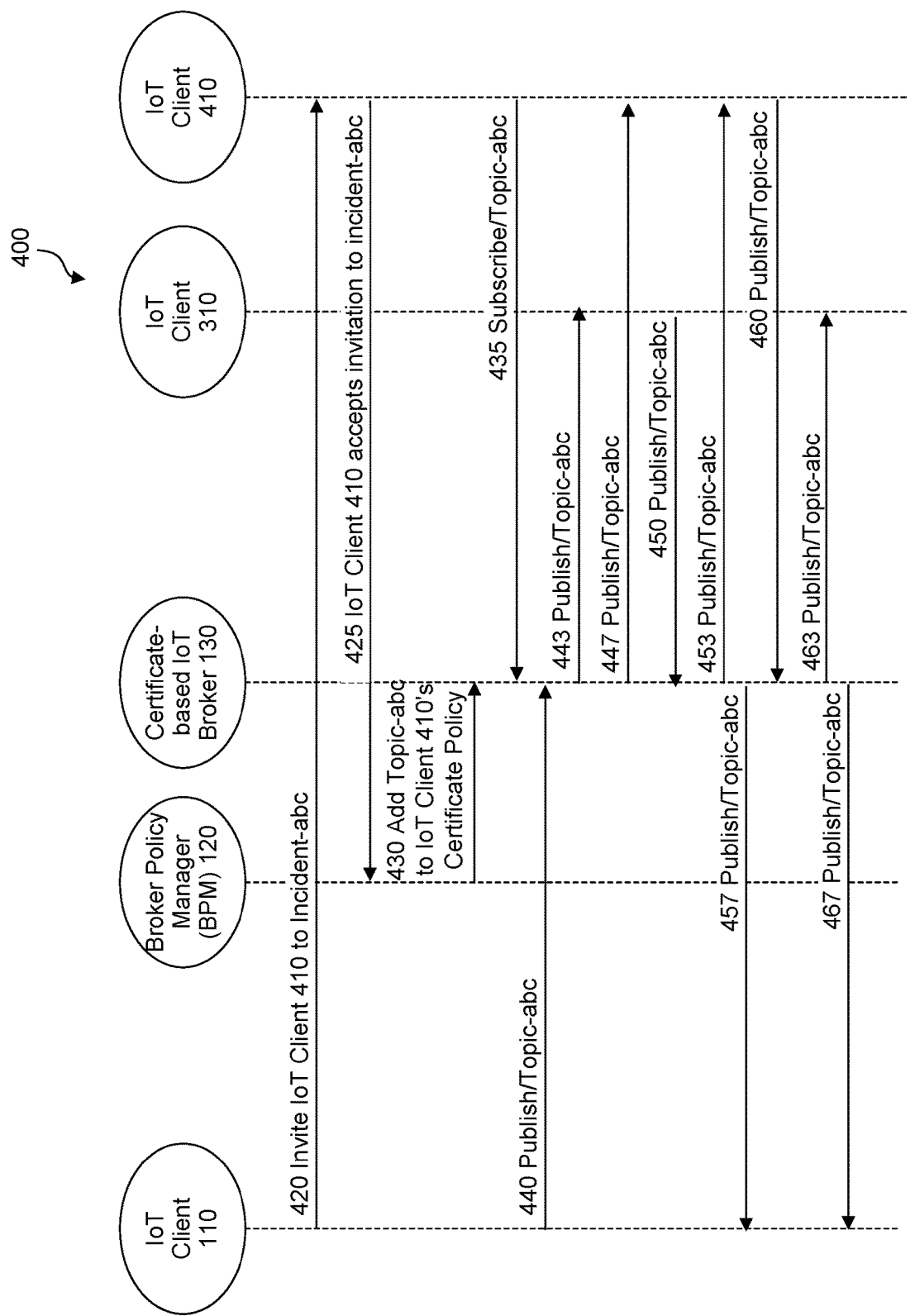
FIG. 4 illustrates a system for dynamic IoT policy management during an incident with multiple IoT clients, according to an example embodiment.

FIG. 4 illustrates a system 400 for dynamic IoT policy management during an incident with multiple IoT clients, according to an example embodiment. As a convenience and not a limitation, system 400, may be described with elements of FIGS. 1-3. System 400 includes IoT Client 110, BPM 120, Certificate-based IoT Broker 130, IoT Client 310, and IoT Client 410. In this example, IoT Client 110 invites IoT Client 410 to join incident-abc communications network, and illustrates the fanning out of publishing messages on Topic-abc to authorized IoT client subscribers.

At 420, IoT Client 110 can invite IoT Client 410 to join incident-abc communications network.

At 425, IoT Client 410 accepts the invitation to join incident-abc communications network. BPM 120 learns about IoT Client 410 joining incident-abc communications network via a signaling channel via IoT Client 110 and/or IoT Client 410, or by listening to a multicast channel of the incident-abc communications network. BPM 120 dynamically determines whether to adjust the policies of the certificate corresponding to IoT Client 410 so that IoT Client 410 can publish and/or subscribe to IoT messages on Topic-abc. In this example, BPM 120 determines that IoT Client 410 can publish and subscribe to Topic-abc.

At 430, BPM 120 can transmit a signal to Certificate-based IoT Broker 130 to change the policy of the certificate associated with IoT Client 410 to allow IoT Client 410 to now publish and subscribe to Topic-abc. Certificate-based IoT Broker 130 updates IoT Client 410's certificate policy accordingly.

At 435, IoT Client 410 can transmit a message to subscribe to Topic-abc. When the message is received, Certificate-based IoT Broker 130 verifies that IoT Client 410 is permitted to subscribe to Topic-abc based on the dynamic policy change due to 430 above. Thereafter, IoT Client 410 can receive information regarding Topic-abc published from other IoT clients (e.g., IoT Client 110 and IoT Client 310) that are authorized to publish on Topic-abc. IoT Clients 110, 310, and 410 can now exchange IoT messages on Topic-abc via Certificate-based IoT Broker 130. In addition to or alternatively, IoT Clients 110, 310, and 410 can continue to exchange media using existing means (e.g., via the incident-abc communications network.)

At 440, IoT Client 110 can transmit a message to Certificate-based IoT Broker 130 to publish on Topic-abc. Certificate-based IoT Broker 130 verifies that IoT Client 110 is permitted to publish on Topic-abc.

At 443, Certificate-based IoT Broker 130 distributes the published message on Topic-abc to IoT Client 310 that subscribed to Topic-abc (e.g., at 350 of FIG. 3 above.)

At 447, Certificate-based IoT Broker 130 distributes the published message on Topic-abc to IoT Client 410 that subscribed to Topic-abc (e.g., at 435 above.)

At 450, IoT Client 310 transmits a publish message on Topic-abc that is received by Certificate-based IoT Broker 130 that verifies that IoT Client 310 is permitted to publish on Topic-abc.

At 453, Certificate-based IoT Broker 130 distributes the published message on Topic-abc to IoT Client 410 based at least on 435 above.

At 457, Certificate-based IoT Broker 130 distributes the published message on Topic-abc to IoT Client 110 based at least on 170 of FIG. 1 above.

At 460, IoT Client 410 transmits a publish message on Topic-abc that is received by Certificate-based IoT Broker 130 that verifies that IoT Client 410 is permitted to publish on Topic-abc.

At 463, Certificate-based IoT Broker 130 distributes the published message on Topic-abc to IoT Client 310 based at least on 350 of FIG. 3 above.

At 467, Certificate-based IoT Broker 130 distributes the published message on Topic-abc to IoT Client 110 based at least on 170 of FIG. 1 above.

Figure 5:
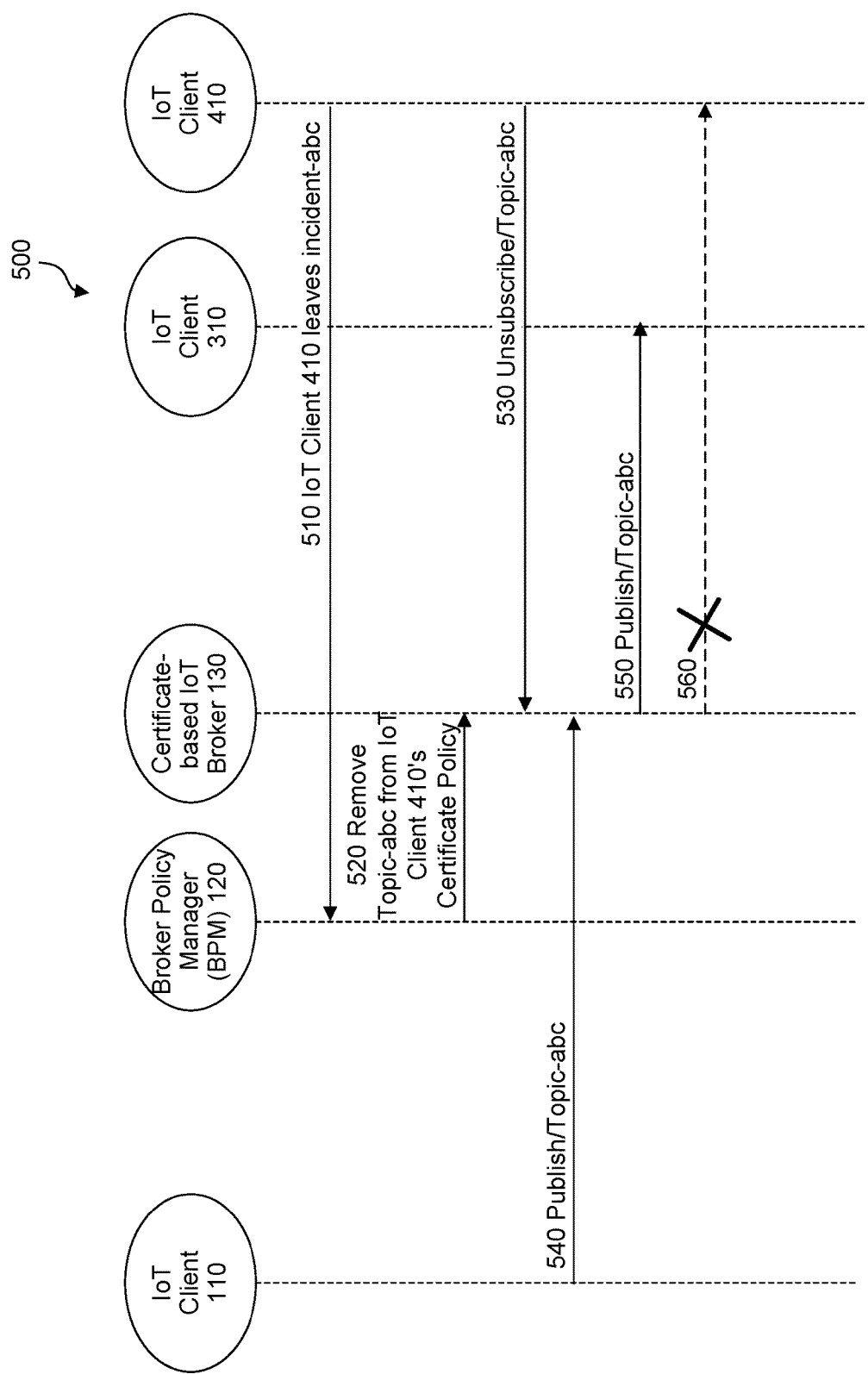
FIG. 5 illustrates a system for dynamic IoT policy management during an incident when an IoT client leaves an incident, according to an example embodiment.

FIG. 5 illustrates a system 500 for dynamic IoT policy management during an incident when an IoT client leaves an incident, according to an example embodiment. As a convenience and not a limitation, system 500, may be described with elements of FIGS. 1-4. System 500 includes IoT Client 110, BPM 120, Certificate-based IoT Broker 130, IoT Client 310, and IoT Client 410. In this example, IoT Client 410 leaves incident-abc communications network, and system 500 illustrates the termination of policies for IoT Client 410 that remove permissions for IoT Client 410 to publish and subscribe to messages on Topic-abc.

At 510, IoT Client 410 leaves incident-abc communications network. BPM 120 learns about IoT Client 410 leaving incident-abc communications network via a signaling channel via IoT Client 110 and/or IoT Client 410, or by listening to a multicast channel of the incident-abc communications network. BPM 120 dynamically determines to adjust the policies of the certificate corresponding to IoT Client 410 so that IoT Client 410 can no longer publish and/or subscribe to Topic-abc.

At 520, BPM 120 can transmit a signal to Certificate-based IoT Broker 130 to change the policy of the certificate associated with IoT Client 410 to remove permissions for IoT Client 410 to publish or subscribe to Topic-abc. Certificate-based IoT Broker 130 updates IoT Client 410's certificate policy accordingly.

At 530, IoT Client 410 can transmit a message to unsubscribe to Topic-abc. When the message is received, Certificate-based IoT Broker 130 verifies that IoT Client 410 is not unsubscribed to Topic-abc based on the dynamic policy change due to 520 above. Thereafter, IoT Client 410 will no longer receive information regarding Topic-abc published from other IoT clients (e.g., IoT Client 110 and IoT Client 310) that are authorized to publish on Topic-abc. While IoT Clients 110 and 310 can continue exchange IoT messages on Topic-abc via Certificate-based IoT Broker 130, and/or via the incident-abc communications network, IoT Client 410 will no longer be permitted to publish (e.g., transmit) or subscribe (e.g., receive) messages regarding Topic-abc.

At 540, IoT Client 110 can transmit a message to Certificate-based IoT Broker 130 to publish on Topic-abc. Certificate-based IoT Broker 130 verifies that IoT Client 110 is permitted to publish on Topic-abc.

At 550, Certificate-based IoT Broker 130 distributes the published message onTopic-abc to IoT Client 310 that subscribed to Topic-abc (e.g., at 350 of FIG. 3 above.)

560 illustrates that Certificate-based IoT Broker 130 does not transmit the published message on Topic-abc to IoT Client 410.

Figure 6:
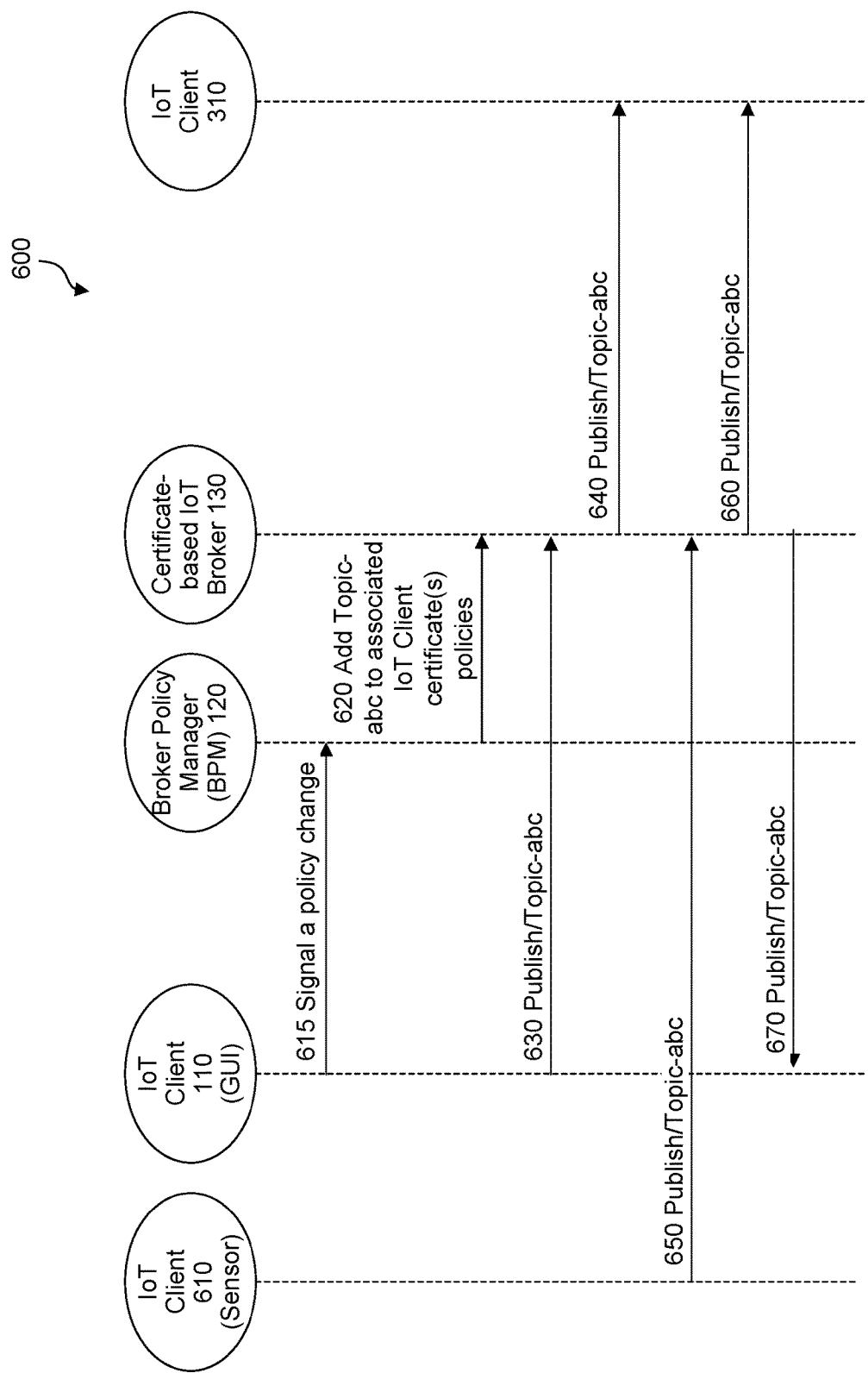
FIG. 6 illustrates a system for dynamic IoT policy management during an incident with associated IoT clients, according to an example embodiment.

FIG. 6 illustrates a system 600 for dynamic IoT policy management during an incident with associated IoT clients, according to an example embodiment. As a convenience and not a limitation, system 600, may be described with elements of FIGS. 1-5. System 600 includes IoT Client 610 (e.g., a sensor), IoT Client 110 (e.g., a GUI), BPM 120, Certificate-based IoT Broker 130, and IoT Client 310. In some embodiments IoT clients with unique identifiers can share the same certificate. In some embodiments, IoT clients with unique identifiers that have separate corresponding certificates that are associated or linked together. For example, IoT Client 110 can be a GUI on an IWS and IoT Client 610 can be a video camera, or an actuator that controls an access to a facility (e.g., locks and unlocks a door). In some examples, IoT Client 110 and IoT Client 610 may be owned by the same agency (e.g., fire department, police department, Federal Bureau of Investigation (FBI), etc.) Thus, when IoT Client 110 joins an incident, one or more IoT clients like IoT Client 610 may also join the incident.

At 615, IoT Client 110 can signal a policy change to BPM 120 that one or more other IoT clients' certificates in addition to IoT Client 110's policy may be authorized to publish and/or subscribe on Topic-abc, where the one or more IoT Clients' certificates are unique. The policy change can be the same or different than that of IoT Client 110. As an example, 615 can be transmitted in time proximity to 140 of FIG. 1. In some embodiments when IoT Client 110 shares the same certificate with another IoT client, then the abilities to publish and/or subscribe are the same as that of IoT Client 110.

At 620, which can be an extension of 150 of FIG. 1, BPM 120 can determine that IoT Client 110 and IoT Client 610 have unique identities but share the same certificate and/or policies. In some embodiments, BPM 120 can determine that IoT Client 110 and IoT Client 610 have unique identities, different certificate/policies, and their certificates are associated or linked together. BPM 120 can dynamically determine whether IoT Client 610 can only-publish, only-subscribe, or publish and subscribe to Topic-abc corresponding to incident-abc, and inform Certificate-based IoT Broker 130 accordingly. In some embodiments the dynamic determination is based on instructions received from IoT Client 110 at 615. In this example, BPM 120 determines that IoT Client 610 can only publish to Topic-abc.

At 630, IoT Client 110 can transmit a message to Certificate-based IoT Broker 130 to publish on Topic-abc. Certificate-based IoT Broker 130 verifies that IoT Client 110 is permitted to publish on Topic-abc.

At 640, Certificate-based IoT Broker 130 distributes the published message on Topic-abc to IoT Client 310 that subscribed to Topic-abc (e.g., at 350 above.) Note that Certificate-based IoT Broker 130 does not transmit the published message on Topic-abc to IoT Client 610 because, according to the instructions of BP 120 at 620 above, IoT Client 610 can only publish to Topic-abc. IoT Client 610 cannot subscribe to Topic-abc.

At 650, IoT Client 610 can transmit a message to Certificate-based IoT Broker 130 to publish on Topic-abc. For example, if IoT Client 610 were a video camera, IoT Client 610 can stream data, or if IoT Client 610 were a sensor, the sensor's readings and/or alarms can be transmitted. Certificate-based IoT Broker 130 verifies that IoT Client 610 is permitted to publish on Topic-abc.

At 660, Certificate-based IoT Broker 130 distributes the published message on Topic-abc to IoT Client 310 that subscribed to Topic-abc (e.g., at 350 above.)

At 670, Certificate-based IoT Broker 130 distributes the published message on Topic-abc to IoT Client 110 that subscribed to Topic-abc (e.g., at 170 of FIG. 1 above.) In some embodiments, IoT Client 110 shares a certificate with one or more IoT Clients, or IoT Client 110 is associated or linked with one or more IoT Clients and/or their corresponding certificates. When IoT Client 110 receives the published information from IoT Client 610 (e.g., a temperature gauge reading and/or an alert regarding the value; or a video stream or image), IoT Client 110 (e.g., as a GUI) may take control of IoT Client 610 (e.g., control pan/tilt/zoom, actuator control to lock or unlock doors.)

In some embodiments, when BPM 120 determines that IoT Client 610 can both publish and subscribe to Topic-abc (not shown), then IoT Client 610 can subscribe to and receive published messages on Topic-abc. For example, other members of the incident communications network can access IoT Client 610 (e.g., control pan/tilt/zoom, or actuator control lock or unlock doors) via the incident-abc communications network or via IoT Client 610 receiving published messages on Topic-abc.

Figure 7:
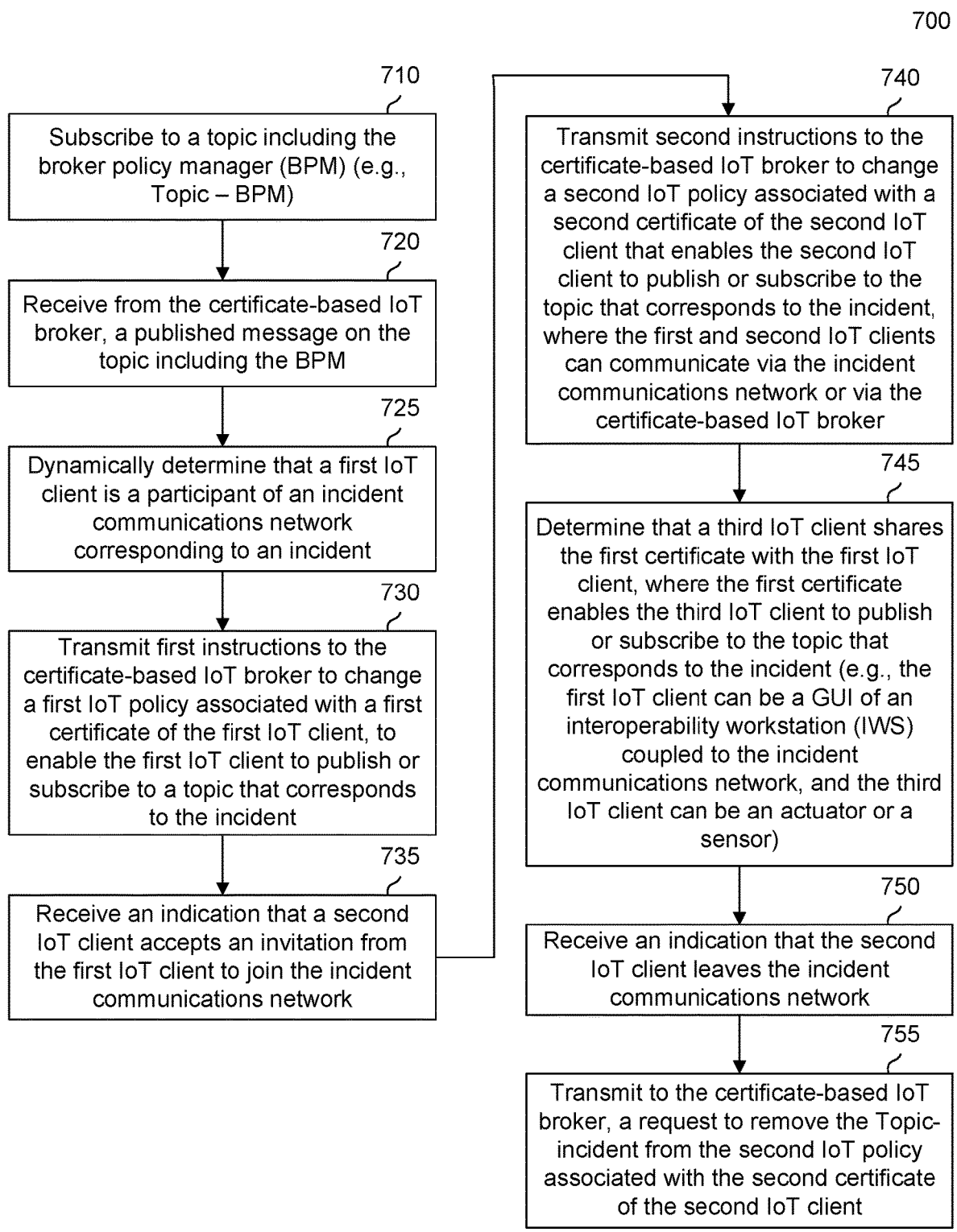
FIG. 7 illustrates a method for a broker policy manager (BPM), according to an example embodiment.

FIG. 7 illustrates a method 700 for a broker policy manager (BPM), according to an example embodiment. As a convenience and not a limitation, method 700, may be described with elements of FIGS. 1-6. For example, method 700 can be provided by system 200 or system 800 described below.

An Incident-based system (e.g., IWS, mobile IWS, IoT Client 110) can specify a topic such as Topic-BPM.

At 710, system 200 (e.g., BPM 120, as an IoT client), can subscribe to Topic-BPM and receive published messages that include Topic-BPM and other information. For example, system 200 can subscribe to Topic-BPM established by the Incident-based system. Subsequently, the Incident-based system can publish to a certificate-based IoT Broker, information on the Topic-BPM, such as the incident name and IoT Client name (e.g., Topic-BPM/incident-abc/IoT Client 110.)

At 720, system 200 can receive from the certificate-based IoT broker, a published message on the topic including the BPM. For example, BPM 120 can receive from Certificate-based IoT Broker 130, a published message on Topic-BPM that includes IoT Client 110 joining or creating incident-abc (e.g., the published message including Topic-BPM/incident-abc/IoT Client 110, Topic-BPM/incident-abc/IoT Client 110/creator).

At 725, system 200 can dynamically determine that a first IoT client is a participant of an incident communications network corresponding to an incident. For example, BPM 120 can make that determination from 720 above. In some embodiments, BPM 120 listens to a multicast channel to learn that IoT Client 110 has been invited to join incident-abc communications network or has created incident-abc communications network. In some embodiments, BPM 120 receives a signal from an Interoperability Workstation (IWS) that IoT Client 110 has been invited to join or has created incident-abc communications network. In some embodiments, system 200 creates Topic-abc or system 200 determines that Topic-abc has been created (e.g., by IoT Client 110). System 200 also determines whether IoT Client 110 is permitted to publish-only, subscribe-only, or publish and subscribe to Topic-abc.

At 730, system 200 can transmit first instructions to the certificate-based IoT broker to change a first IoT policy associated with a first certificate of the first IoT client, to enable the first IoT client to publish and/or subscribe to a topic that includes the incident. For example, BPM 120 can transmit a signal to Certificate-based IoT Broker 130 to change the policy of the certificate associated with IoT Client 110 to allow IoT Client 110 to now publish and subscribe to Topic-abc. Certificate-based IoT Broker 130 updates IoT Client 110's certificate policy accordingly.

At 735, system 200 can receive an indication that a second IoT client accepts an invitation from the first IoT client to join the incident communications network. For example, BPM 120 can learn about IoT Client 310 joining incident-abc communications network via a signaling channel via IoT Client 110 and/or IoT Client 310, or by listening to a multicast channel of the incident-abc communications network. BPM 120 dynamically determines whether to adjust the policies of the certificate corresponding to IoT Client 310 so that IoT Client 310 can publish and/or subscribe to IoT messages on Topic-abc. In this example, BPM 120 determines that IoT Client 310 can publish and subscribe to Topic-abc.

At 740, system 200 can transmit second instructions to the certificate-based IoT broker to change a second IoT policy associated with a second certificate of the second IoT client that enables the second IoT client to publish and subscribe to the topic that includes the incident, where the first and second IoT clients can communicate via the incident communications network and/or via the certificate-based IoT broker. For example, BPM 120 can transmit a signal to Certificate-based IoT Broker 130 to change the policy of the certificate associated with IoT Client 310 to allow IoT Client 310 to now publish and subscribe to Topic-abc. Certificate-based IoT Broker 130 updates IoT Client 310's certificate policy accordingly. IoT Clients 110 and 310 can communicate via the incident-abc communications network and/or via the certificate-based IoT broker.

At 745, system 200 can determine that a third IoT client shares the first certificate with the first IoT client, where the first certificate enables the third IoT client to publish and/or subscribe to the topic that comprises the incident (e.g., the first IoT client can be a GUI of an interoperability workstation (IWS) coupled to the incident-abc communications network, and the third IoT client can be an actuator or a sensor.) For example, BPM 120 can determine that IoT Client 110 and IoT Client 610 have unique identities yet share the same certificate and/or policies. In some embodiments, BPM 120 can determine that IoT Client 110 and IoT Client 610 have unique identities, different certificate, but their certificates are associated. BPM 120 can dynamically determine whether IoT Client 610 can only-publish, only-subscribe, or publish and subscribe to Topic-abc corresponding to incident-abc, and inform Certificate-based IoT Broker 130 accordingly. In some embodiments the dynamic determination is based on instructions received from IoT Client 110 at 615 of FIG. 6.

At 750, system 200 can receive an indication that the second IoT client leaves the incident.

At 755, system 200 can transmit to the certificate-based IoT broker, a request to remove the Topic-incident from the second IoT policy associated with the second certificate.

System Implementation

Figure 8:
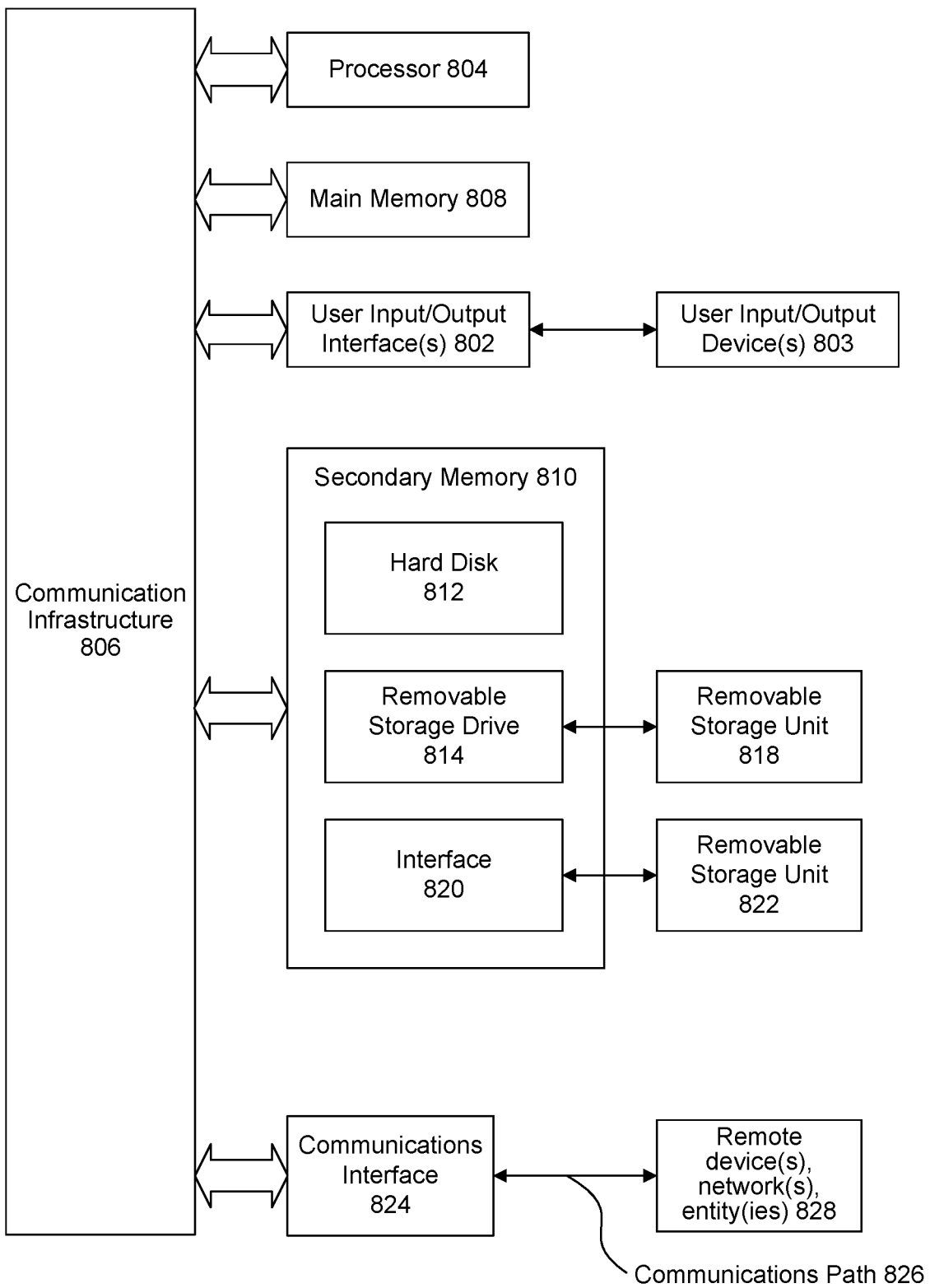
FIG. 8 is a diagram of an example computing system, according to an example embodiment.

Various embodiments can be implemented, by software, firmware, hardware, or a combination thereof. FIG. 8 illustrates and example computer system 800 in which the systems and devices described within various embodiments can be implemented as computer-readable code and/or text-readable code. After reading this description, it will become apparent to a person skilled in the relevant art how to implement the embodiments using other systems and/or processing architectures. For example, an IoT client, Broker Policy Manager (BPM), and/or a Certificate-based IoT Broker may be implemented by computer system 800.

Computer system 800 includes one or more processors (also called central processing units, or CPUs), such as a processor 804. Processor 804 is connected to a communication infrastructure 806 that can be a bus. One or more processors 804 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 also includes user input/output device(s) 803, such as monitors, keyboards, pointing devices, etc., that communicate with communication infrastructure 806 through user input/output interface(s) 802. Computer system 800 also includes a main or primary memory 808, such as random access memory (RAM). Main memory 808 may include one or more levels of cache. Main memory 808 has stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to an exemplary embodiment, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use embodiments of the invention using data processing devices, computer systems and/or computer architectures. In particular, embodiments may operate with software, hardware, and/or operating system implementations other than those described herein.

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

The breadth and scope of the invention should not be limited by any of the above-described exemplary embodiments, but should be defined only in accordance with the following claims and their equivalents.

What is claimed is:

1. A system for a broker policy manager (BPM), comprising:
   a transceiver; and
   one or more processors coupled to the transceiver, configured to:
      subscribe to a first topic the BPM;
      receive from a certificate-based Internet of Things (IoT) broker, a first published message on the first topic comprising the BPM;
      determine, based on the first topic comprising the BPM, that a first IoT client is a participant in an incident communications network corresponding to an incident;
      transmit first instructions to the certificate-based IoT broker to change a first IoT policy associated with a first certificate of the first IoT client, to enable the first IoT client to publish or subscribe to a second topic corresponding to the incident;
      receive a second indication that a second IoT client accepts an invitation from the first IoT client to join the incident communications network;

transmit second instructions to the certificate-based IoT broker to change a second IoT policy associated with a second certificate of the second IoT client that enables the second IoT client to publish or subscribe to the second topic corresponding to the incident; and determine that a third IoT client has a third certificate associated with the first certificate of the first IoT client based on a third indication received from the first IoT client, wherein the first instructions transmitted to the certificate-based IoT broker change a third IoT policy associated with the third certificate of the third IoT client to enable the third IoT client to publish or subscribe to the first topic.

2. The system of claim 1, wherein to determine that the first IoT client is the participant in the incident communications network, the one or more processors are configured to:

receive a first indication via the transceiver, directly or indirectly from the first IoT client, that the first IoT client has created the incident communications network, or that the first IoT client has been invited to join the incident communications network.

3. The system of claim 1, wherein the published message on the first topic comprising the BPM indicates that the first IoT client created the incident.

4. The system of claim 1, wherein to receive the published message is based on a real time publication-subscription, data-sync, or request-response protocol, comprising: HyperText Transfer Protocol (HTTP), Streaming Text Oriented Messaging Protocol (STOMP), Advanced Message Queuing Protocol (AMQP), Web Application Messaging Protocol (WAMP), Java Message Service (JMS), ZeroMQ Message Transport Protocol (ZMTP), or proprietary messaging protocols.

5. The system of claim 1, wherein the first IoT client comprises: a software routine; a web browser; a map or a region of a map; a graphical user interface (GUI); an actuator; an artificial intelligence or analytics based object, event, or condition; a sensor; a sensor coupled to another device or module that causes an alarm, event notification, or warning signal to be transmitted to a rules-based or pre-designated recipient agent; a gas sensor; a smoke/fire detector; or a contact closure of a switch or panic button.

6. The system of claim 5, wherein the first IoT client comprises a GUI of an interoperability work station (IWS) coupled to the incident communications network.

7. The system of claim 1, wherein the one or more processors are further configured to:

determine that the third IoT client shares the first certificate with the first IoT client, wherein the first certificate enables the third IoT client to publish or subscribe to the second topic that comprises the incident.

8. The system of claim 1, wherein to determine that the first IoT client is the participant of the incident communications network, the one or more processors are configured to:

receive, via the transceiver, a first indication on a multicast channel of a multicast-based communication system, that the first IoT client has been invited to join the incident communications network.

9. The system of claim 1, wherein the first IoT client and the second IoT client are configured to exchange information via the incident communications network or via the certificate-based IoT broker.

10. The system of claim 1, wherein the one or more processors are configured to:

determine that the first IoT client has left incident communications network; and transmit a signal to dynamically adjust a policy of certificate corresponding to the first IoT client.

11. A method for a broker policy manager (BPM), comprising:

subscribing to a first topic comprising the BPM;

receiving, from a certificate-based Internet of Things (IoT) broker, a published message on the first topic corresponding to the BPM;

determining, based on the first topic comprising the BPM, that a first IoT client is a participant in an incident communications network corresponding to an incident;

transmitting first instructions to the certificate-based IoT broker to change a first IoT policy associated with a first certificate of the first IoT client, to enable the first IoT client to publish or subscribe to a second topic that corresponds to the incident receiving a second indication that a second IoT client accepts an invitation from the first IoT client to join the incident communications network;

transmitting second instructions to the certificate-based IoT broker to change a second IoT policy associated with a second certificate of the second IoT client that enables the second IoT client to publish or subscribe to the first topic corresponding to the incident; and determining that a third IoT client has a third certificate associated with the first certificate of the first IoT client based on a third indication received from the first IoT client, wherein the first instructions transmitted to the certificate-based IoT broker change a third IoT policy associated with the third certificate of the third IoT client to enable the third IoT client to publish or subscribe to the first topic.

12. The method of claim 11, wherein the determining that the first IoT client is the participant in the incident communications network comprises:

receiving a first indication directly or indirectly from the first IoT client, that the first IoT client has created the incident communications network, or that the first IoT client has been invited to join the incident communications network.

13. The method of claim 11, wherein the published message on the first topic corresponding to the BPM indicates that the first IoT client created the incident communications network.

14. The method of claim 11, wherein the first IoT client comprises: a sensor coupled to another device or module that causes an alarm, event notification, or warning signal to be transmitted to a rules-based or pre-designated recipient agent; a gas sensor; a smoke/fire detector; or a contact closure of a switch or panic button.

15. The method of claim 14, wherein the first IoT client comprises a GUI of an interoperability work station (IWS) coupled to the incident communications network and wherein the second IoT client comprises an actuator.

16. The method of claim 11, further comprising:

determining that the third IoT client shares the first certificate with the first IoT client, wherein the first certificate enables the third IoT client to publish or subscribe to the second topic that comprises the incident.

17. The method of claim 11, wherein the first IoT client and the second IoT client are configured to exchange information via the incident communications network or via the certificate-based IoT broker.

18. A non-transitory computer-readable medium storing instructions that, when executed by a processor of a first electronic device, cause the first electronic device to perform operations for a broker policy manager (BPM), the operations comprising:
  subscribing to a first topic comprising the BPM;
  receiving, from a certificate-based Internet of Things (IoT) broker, a published message on the first topic corresponding to the BPM;
  determining, based on the first topic comprising the BPM, that a first IoT client is a participant in an incident communications network corresponding to an incident;
  transmitting first instructions to the certificate-based IoT broker to change a first IoT policy associated with a first certificate of the first IoT client, to enable the first IoT client to publish or subscribe to a second topic that corresponds to the incident
  receiving a second indication that a second IoT client accepts an invitation from the first IoT client to join the incident communications network;
  transmitting second instructions to the certificate-based IoT broker to change a second IoT policy associated with a second certificate of the second IoT client that enables the second IoT client to publish or subscribe to the first topic corresponding to the incident; and
  determining that a third IoT client has a third certificate associated with the first certificate of the first IoT client based on a third indication received from the first IoT client, wherein the first instructions transmitted to the certificate-based IoT broker change a third IoT policy associated with the third certificate of the third IoT client to enable the third IoT client to publish or subscribe to the first topic.

19. The non-transitory computer-readable medium of claim 18, wherein the determining that the first IoT client is the participant of the incident communications network operation comprises: receiving a first indication on a multicast channel of a multicast-based communication system, that the first IoT client has created the incident communications network.

20. The non-transitory computer-readable medium of claim 18, wherein the first IoT client comprises: a state change state detection module that interprets video data, either alone or in concert with other real time, historical or predictive data from other sensors, systems, databases, analytical functions, or information sources.

21. The non-transitory computer-readable medium of claim 18, wherein the receiving the published message is based on a real time publication-subscription, data-sync, or request-response protocol, comprising: Message Queueing Telemetry Transport (MQTT) protocol or Extensible Messaging and Presence Protocol (XMPP).

22. The non-transitory computer-readable medium of claim 18, wherein the first IoT client and the second IoT client are configured to exchange information via the incident communications network or via the certificate-based IoT broker.

23. The non-transitory computer-readable medium of claim 18, wherein the operations further comprise determining that the third IoT client shares the first certificate with the first IoT client, wherein the first certificate enables the third IoT client to publish or subscribe to the second topic that comprises the incident.

* * * * *